(12) United States Patent
Hon et al.

(10) Patent No.: US 11,796,509 B2
(45) Date of Patent: Oct. 24, 2023

(54) HUMIDITY SENSOR AND AIR-CONDITIONING APPARATUS

(71) Applicant: Mitsubishi Electric Corporation, Tokyo (JP)

(72) Inventors: Jini Hon, Tokyo (JP); Akira Morikawa, Tokyo (JP); Noriaki Katsumata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/913,161

(22) PCT Filed: May 7, 2020

(86) PCT No.: PCT/JP2020/018496
§ 371 (c)(1),
(2) Date: Sep. 21, 2022

(87) PCT Pub. No.: WO2021/224954
PCT Pub. Date: Nov. 11, 2021

(65) Prior Publication Data
US 2023/0119777 A1    Apr. 20, 2023

(51) Int. Cl.
*G01N 29/02*       (2006.01)
*G01N 29/024*      (2006.01)
*F24F 110/20*      (2018.01)

(52) U.S. Cl.
CPC ........ *G01N 29/024* (2013.01); *F24F 2110/20* (2018.01); *G01N 2291/02845* (2013.01)

(58) Field of Classification Search
CPC ............................ F24F 2110/20; G01K 11/24
See application file for complete search history.

(56) References Cited

U.S. PATENT DOCUMENTS

| | | | |
|---|---|---|---|
| 2003/0060708 A1* | 3/2003 | Ogawa | G01S 15/8968 600/437 |
| 2003/0188580 A1* | 10/2003 | Cardelius | G01N 29/4436 73/24.01 |

(Continued)

FOREIGN PATENT DOCUMENTS

| | | |
|---|---|---|
| CN | 1842694 A | 10/2006 |
| CN | 102472727 A | 5/2012 |

(Continued)

OTHER PUBLICATIONS

International Search Report and Written Opinion dated Jun. 30, 2020, received for PCT Application PCT/JP2020/018496, filed on May 7, 2020, 8 pages including English Translation.

(Continued)

*Primary Examiner* — Jerry-Daryl Fletcher
*Assistant Examiner* — Daniel C Comings
(74) *Attorney, Agent, or Firm* — XSENSUS LLP

(57) ABSTRACT

A humidity sensor includes a sound wave element configured to transmit a sound wave and receive the sound wave reflected by a reflector, a reception circuit configured to obtain an arrival time of the reflected wave received by the sound wave element, and a humidity analysis circuit configured to calculate humidity by using the arrival time, a distance from the sound wave element to the reflector, and a temperature of a space from the sound wave element to the reflector.

20 Claims, 10 Drawing Sheets

(56) References Cited

U.S. PATENT DOCUMENTS

| | | | |
|---|---|---|---|
| 2007/0079619 A1* | 4/2007 | Hamada | F24F 1/0083 62/186 |
| 2010/0259396 A1 | 10/2010 | Watabe et al. | |
| 2011/0320013 A1* | 12/2011 | Chen | F24F 11/65 700/12 |
| 2012/0109536 A1 | 5/2012 | Pasveer et al. | |
| 2015/0323210 A1* | 11/2015 | Khiani | F24F 11/77 454/239 |
| 2017/0082381 A1 | 3/2017 | Sugimura et al. | |
| 2017/0212084 A1 | 7/2017 | Komiya et al. | |
| 2018/0217008 A1 | 8/2018 | Li et al. | |

FOREIGN PATENT DOCUMENTS

| | | | | |
|---|---|---|---|---|
| CN | 107917956 A * | 4/2018 | | G01D 21/02 |
| EP | 1 353 173 A2 | 10/2003 | | |
| JP | 3-67195 A | 3/1991 | | |
| JP | 7-26759 A | 5/1995 | | |
| JP | 8-94594 A | 4/1996 | | |
| JP | 2000-241399 A | 9/2000 | | |
| JP | 2012-225756 A | 11/2012 | | |
| JP | 2017-129506 A | 7/2017 | | |
| JP | 2018-141596 A | 9/2018 | | |
| WO | 2009/054359 A1 | 4/2009 | | |
| WO | WO-2016051570 A1 * | 4/2016 | | F24F 11/76 |

OTHER PUBLICATIONS

Kataoka, "Hygrometer by Using Ultrasound", Feb. 22, 2006, 41 pages including English Abstract.

Notice of Reasons for Refusal dated Dec. 1, 2020, received for JP Application 2020-548828, 6 pages including English Translation.

Decision to Grant dated Jan. 26, 2021, received for JP Application 2020-548828, 5 pages including English Translation.

Extended European Search Report dated May 12, 2023 in European Patent Application No. 20934416.7, 9 pages.

Office Action dated Jun. 2, 2023 in Chinese Patent Application No. 202080100365.5, 8 pages.

Office Action dated Mar. 4, 2023, in corresponding Chinese patent Application No. 2020801003655, 10 pages.

Decision of Rejection dated Aug. 28, 2023, in corresponding Chinese patent Application No. 202080100365.5, 9 pages.

* cited by examiner

HUMIDITY SENSOR AND AIR-CONDITIONING APPARATUS

CROSS-REFERENCE TO RELATED APPLICATION

The present application is based on PCT filing PCT/JP2020/018496, filed May 7, 2020, the entire contents of which are incorporated herein by reference.

TECHNICAL FIELD

The present disclosure relates to a humidity sensor measuring humidity in a non-contact manner and an air-conditioning apparatus equipped with the humidity sensor.

BACKGROUND ART

Conventionally, as devices measuring air humidity, a wet-and-dry-bulb psychrometer, a hair tension hygrometer, a dew-point detecting sensor, a thermistor humidity sensor, a lithium chloride humidity sensor, a ceramic humidity sensor, and polymer film humidity sensor are well known. In addition, as a technique for measuring humidity in a non-contact manner, a humidity measurement using change in sound velocity and a scattering phenomenon of ultrasound waves due to air moisture is also known. For example, a humidity sensor that measures air humidity based on an attenuation ratio of ultrasound waves and temperature has been proposed in Patent Literature 1.

CITATION LIST

Patent Literature

Patent Literature 1: Japanese Unexamined Utility Model Registration Application Publication No. 7-26759

SUMMARY OF INVENTION

Technical Problem

The humidity sensor described in Patent Literature 1 has a configuration in which a transmitter transmitting ultrasound waves and a receiver receiving the ultrasound waves transmitted from the transmitter are arranged to face each other with a certain distance therebetween. However, in this configuration, the transmitter and the receiver need to be arranged separately from each other. This leads to not only a reduction in the usability but also enlargement of the humidity sensor.

The present disclosure has been made to overcome the above-mentioned problems, and has an object to provide a humidity sensor and an air-conditioning apparatus with a reduced size capable of measuring humidity in a non-contact manner.

Solution to Problem

A humidity sensor according to an embodiment of the present disclosure includes a sound wave element configured to transmit a sound wave and receive the sound wave reflected by a reflector, a reception circuit configured to obtain an arrival time of the reflected wave received by the sound wave element, and a humidity analysis circuit configured to calculate humidity by using the arrival time, a distance from the sound wave element to the reflector, and a temperature of a space from the sound wave element to the reflector. An air-conditioning apparatus according to another embodiment of the present disclosure includes the above-mentioned humidity sensor, a heat exchanger, and a fan.

Advantageous Effects of Invention

According to an embodiment of the present disclosure, because transmission and reception of sound waves can be performed by a single sound wave element, the size of the non-contact humidity sensor can be reduced.

DESCRIPTION OF EMBODIMENTS

Embodiment 1

Figure 1:
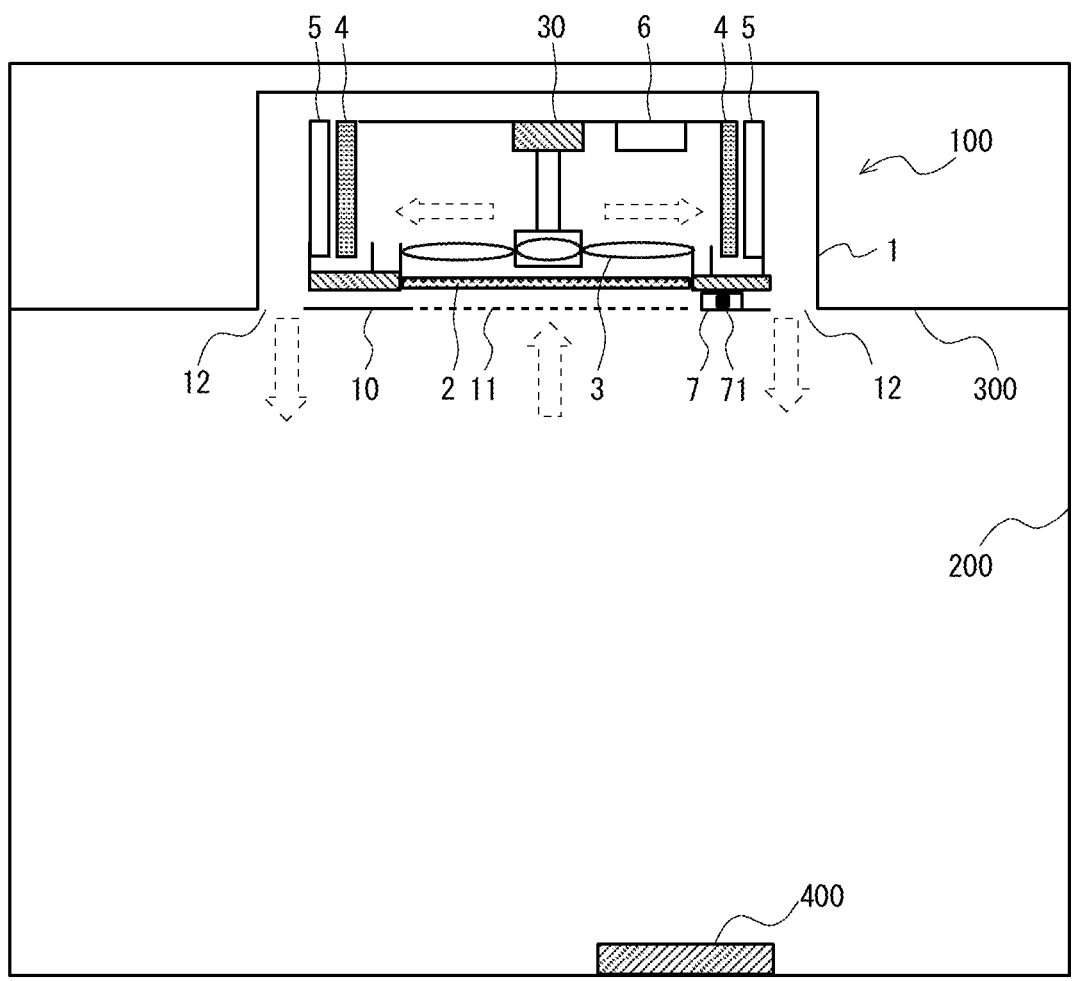
FIG. 1 is a schematic diagram of an air-conditioning apparatus equipped with a humidity sensor according to Embodiment 1.

FIG. 1 is a schematic diagram of an air-conditioning apparatus 100 equipped with a humidity sensor 7 according to Embodiment 1. As shown in FIG. 1, the air-conditioning apparatus 100 is a ceiling embedded type indoor unit that is installed on a ceiling 300 of a room 200, which is an air-conditioned space. The room 200 is an office space for business use or an indoor space of a general house. The ceiling 300 is installed at a height of two meters or more in the room 200. The air-conditioning apparatus 100 is installed at an installation opening, which is formed by removing a part of the ceiling 300. The room 200 is provided with a reflector 400. The reflector 400 is a metallic plate, a resin plate or a wood plate, and is installed on a floor surface or a wall surface of the room 200. A face of the reflector 400 facing the inside of the room 200 has a smooth surface. Note that, instead of installing the reflector 400 individually, a part of the floor surface or a part of the wall surface of the room 200 can be used as the reflector 400.

(Configuration of Air-Conditioning Apparatus 100)

The air-conditioning apparatus 100 is a package type air-conditioning apparatus having a cooling function, a heating function, and a humidification function. Note that, the air-conditioning apparatus 100 may be a cassette type air conditioner, a room air conditioner, an outdoor air treating unit, or a similar device. As shown in FIG. 1, the air-conditioning apparatus 100 includes a casing 1, a filter 2, a fan 3, a heat exchanger 4, a humidification element 5, a controller 6, and a humidity sensor 7.

The casing 1 is formed in a box shape and has a bottom 10 exposed on the ceiling 300. An air inlet 11 is provided at the center of a bottom 10, and an air outlet 12 is provided along the four sides of the bottom 10. Note that, the terms "upstream" and "downstream" in the following description respectively indicate the upstream and the downstream in a flow direction of air from the air inlet 11 to the air outlet 12. The filter 2 is installed on the downstream of the air inlet 11 to collect dust in the air sucked from the air inlet 11. The fan 3 is arranged between the filter 2 and the heat exchanger 4 in the casing 1. The fan 3 is, for example, an axial fan, and is driven by a motor 30. The motor 30 is controlled by the controller 6.

The heat exchanger 4 is installed on the downstream of the fan 3. The heat exchanger 4 exchanges heat between refrigerant flowing therein and air taken into the casing 1 from the air inlet 11. The heat exchanger 4 is connected, by a refrigerant pipe, to an outdoor unit (not shown) having a compressor and a heat exchanger, thereby forming a part of a refrigerant circuit. The heat exchanger 4 has, for example, a fin-and-tube structure made of aluminum. The heat exchanger 4 functions as a condenser in a heating operation to heat the air and functions as an evaporator in a cooling operation to cool the air. The heat exchanger 4 may be obliquely arranged in such a manner that a lower end portion is placed on the upstream side and an upper end portion is placed on the downstream side.

The humidification element 5 is formed by, for example, stacking a plurality of paper or resin sheets having a porous or fibrous property. The humidification element 5 is arranged on the downstream of the heat exchanger 4 along the heat exchanger 4. The length of a long side of the humidification element 5 is substantially the same as the length of a long side of the heat exchanger 4. The humidification element 5 absorbs water supplied from a water supply tank, which is not shown, installed above. When air passes through the water-absorbed humidification element 5, water evaporates from the humidification element 5, thereby humidifying the air. Although tap water or industrial water can be used as the water, it is preferable that water containing fewer scale components, such as potassium, magnesium, and silica, which cause deposition, be used. Note that, in another embodiment, the humidification element 5 may be omitted and the air-conditioning apparatus 100 may be configured to have no humidification function.

The controller 6 is formed by using dedicated hardware, such as an application-specific integrated circuit (ASIC) or a field-programmable gate array (FPGA), a processing device, such as a microcomputer executing a program stored in a memory, or both of them. The controller 6 is configured to control a rotation speed of the motor 30 based on the temperature or the humidity of the room 200. As shown by broken arrows in FIG. 1, by rotating the fan 3 by the motor 30, air is sucked from the air inlet 11. After the air passes through the filter 2 and dust is thereby removed from the air, the air passes through the heat exchanger 4. After the air is cooled or heated by the heat exchanger 4, the air is then humidified when passing through the humidification element 5. The air is thus conditioned and discharged from the air outlet 12.

The humidity sensor 7 is a device that measures the humidity in the room 200 in a non-contact manner. The humidity sensor 7 includes an ultrasound element 71 that transmits and receives ultrasound waves. The ultrasound element 71 is arranged on the bottom 10 of the casing 1 at a position between the air inlet 11 and the air outlet 12. In the present embodiment, one ultrasound element 71 is arranged on the left side or right side of the air inlet 11 in such a manner as to face the reflector 400.

(Configuration of Humidity Sensor)

Figure 2:
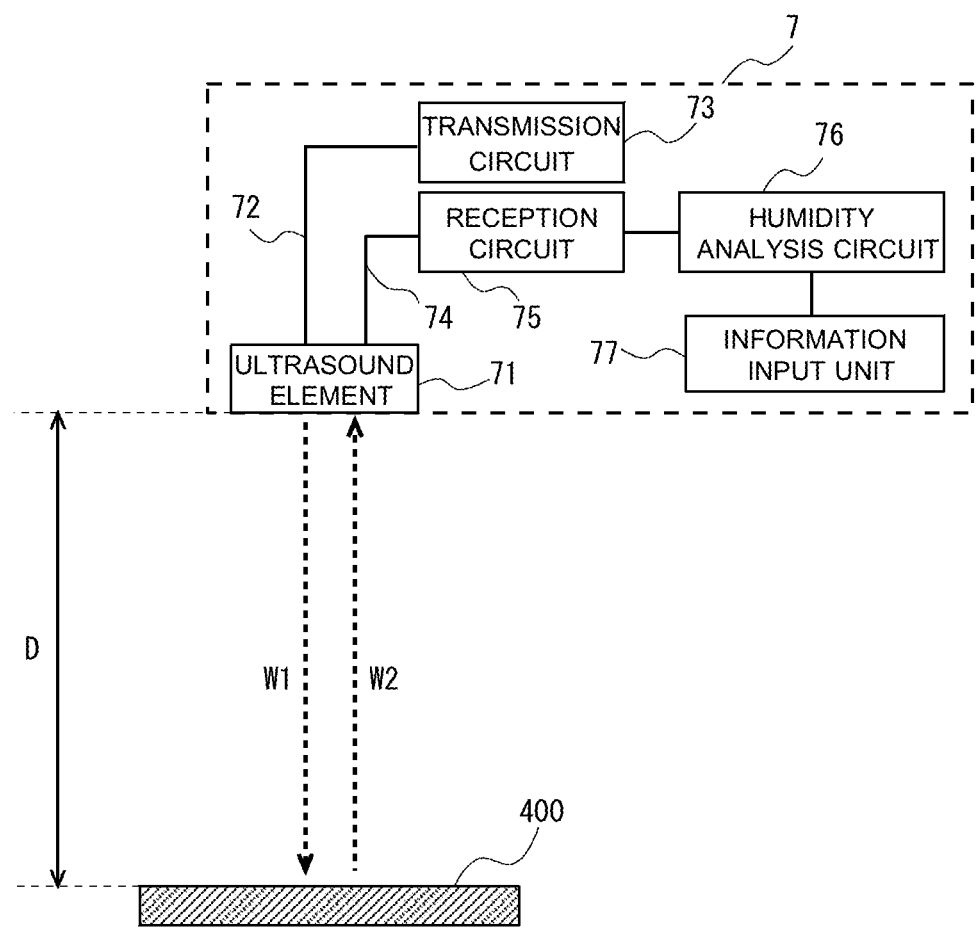
FIG. 2 is a diagram illustrating the configuration of the humidity sensor according to Embodiment 1.

FIG. 2 is a diagram illustrating the configuration of the humidity sensor 7 according to Embodiment 1. As shown in FIG. 2, the humidity sensor 7 includes the ultrasound element 71, a transmission circuit 73, a reception circuit 75, a humidity analysis circuit 76, and an information input unit 77. The ultrasound element 71 includes a piezoelectric ceramic and electrodes, and is configured to transmit and receive ultrasound waves. When a high frequency voltage is applied to the piezoelectric ceramic from one electrode, the piezoelectric ceramic contracts and expands repeatedly, and this vibration generates ultrasound waves. When the piezoelectric ceramic is vibrated by received ultrasound waves, voltage is generated at both ends of the piezoelectric ceramic in response to this vibration. By using this principle, the ultrasound element 71 can transmit sound waves having a frequency of 20 kHz or higher, that is ultrasound waves, and can receive and convert ultrasound waves in air into voltage. The ultrasound element 71 of the present embodiment is a single element that can transmit ultrasound waves from the ceiling 300 of the room 200 to the reflector 400, and can receive reflected ultrasound waves returning from the reflector 400.

The ultrasound element 71 is connected to the transmission circuit 73 via an electric wire 72. The transmission circuit 73 is configured to supply a pulse wave to the ultrasound element 71. The ultrasound element 71 is also connected to the reception circuit 75 via an electric wire 74. The reception circuit 75 is configured to amplify an output from the ultrasound element 71 and perform an analog-to-digital (A/D) conversion of the output. Because the output from the ultrasound element 71 is an analog signal, the reception circuit 75 is provided with an A/D converter converting an analog signal into a digital signal. The sampling frequency of the A/D conversion in the reception circuit 75 is 2.4 MHz, and the resolution is 12 bits. It is preferable that the sampling frequency be twice or more times the frequency of the pulse wave applied to the ultrasound element 71. The sampling frequency is, for example, eight times the applied voltage. In addition, the reception circuit 75 is configured to analyze a converted digital signal to obtain a reflected wave arrival time t (ms). The reception circuit 75 is configured to input the obtained reflected wave arrival time t to the humidity analysis circuit 76.

The humidity analysis circuit 76 is configured to obtain a relative humidity U (% RH) of the room 200 by using the reflected wave arrival time t input from the reception circuit 75, and a temperature T (degrees C.) and a distance D (m) input from the information input unit 77. The temperature T is the temperature of a space between the ultrasound element 71 and the reflector 400, and is the temperature of the room 200, for example. The distance D is the distance between the ultrasound element 71 and the reflector 400.

The information input unit 77 is configured to input the temperature T of the room 200 and the distance D from the ultrasound element 71 to the reflector 400 to the humidity analysis circuit 76. The temperature T and the distance D are input via an input interface, such as a remote controller of the air-conditioning apparatus 100, for example, and are stored in a memory, which is not shown. The information input unit 77 is configured to read out the temperature T and the distance D from the memory and input the temperature T and the distance D to the humidity analysis circuit 76. Alternatively, the information input unit 77 may be an input interface. Information being input via the information input unit 77 itself may be input to the humidity analysis circuit 76.

The distance D from the ultrasound element 71 to the reflector 400 may be any distance; however, if the distance D is too long, ultrasound waves are attenuated and cannot reach the reflector 400. An ultrasound wave having a smaller frequency reaches farther but the directivity is increased. When the directivity is increased, irregular reflection of ultrasound waves easily occurs in the room 200. This irregular reflection is unfavorable because waveforms to be detected by the ultrasound element 71 become complicated. Because one side of the room 200 as a living space is about 10 meters in the maximum length, the distance D is 10 meters at maximum. To make an ultrasound wave travel the maximum distance, which is 10 meters, the frequency of a pulse wave supplied to the ultrasound element 71 is set to 40 kHz, for example.

(Operation of Humidity Sensor)

Operation for measuring the relative humidity U by the humidity sensor 7 according to the present embodiment will be described. First, the transmission circuit 73 applies a pulse wave having a frequency of 40 kHz, for example, to the ultrasound element 71 to cause the ultrasound element 71 to generate an ultrasound wave. The output of the transmission circuit 73 is not limited to the pulse wave, and may be a continuous wave, such as a sine wave alternating current. The ultrasound wave generated by the ultrasound element 71 reaches the reflector 400 as a transmission wave W1 shown by an arrow in FIG. 2, and then is reflected by the reflector 400. The reflected wave, as a reflected wave W2, is received by the ultrasound element 71.

In the ultrasound element 71, the received reflected wave W2 is converted into voltage and is then transmitted to the reception circuit 75 via the electric wire 74. By performing the A/D conversion, the reception circuit 75 converts the reflected wave W2 into a digital signal, and obtains the reflected wave arrival time t from the digital signal. The humidity analysis circuit 76 obtains the humidity of the room 200 by using the reflected wave arrival time t obtained by the reception circuit 75, and the temperature T of the room 200 and the distance D from the ultrasound element 71 to the reflector 400 input from the information input unit 77.

The humidity analysis circuit 76 may be communicably connected to the controller 6 of the air-conditioning apparatus 100 to transmit the obtained humidity to the controller 6. The controller 6 of the air-conditioning apparatus 100 may perform air-conditioning control based on the received humidity or may display the received humidity on a display unit (not shown) of the remote controller. Alternatively, the humidity analysis circuit 76 may be communicably connected to an external device other than the air-conditioning apparatus 100. The obtained humidity may be transmitted to the external device and displayed on a display unit of the external device.

A process for obtaining the relative humidity U will be described below based on a theoretical formula and experimental results. The relative humidity U can be derived by a known method by using a state equation and the Tetens' empirical formula. The following formula (1) is derived where U is the relative humidity (% RH), Pd is the pressure of dry air (hPa), T is the temperature (degrees C.), c is the speed of sound (m/s), Md is the average molecular weight of dry air, γ is the constant pressure specific heat ratio of air, and R is the universal gas constant (J/K·mol).

[Formula 1]

$$U = \frac{P_d}{6.11 \times 10\exp\left(\frac{7.5T}{237.3+T}\right)} \times \left(\frac{c^2 M_d}{\gamma R(273.15+T)} - 1\right) \quad (1)$$

Here, in the formula (1), the pressure of dry air Pd, the average molecular weight of dry air Md, the constant pressure specific heat ratio γ, and the universal gas constant R are constants. The speed of sound c (m/s) in the formula (1) is represented by the following formula (2), where D is the distance to the reflector 400 and t is the reflected wave arrival time.

[Formula 2]

$$c = \frac{2D}{t} \quad (2)$$

Therefore, when the distance D to the reflector 400, the temperature T of the room 200, and the reflected wave arrival time t are found, the relative humidity U can be obtained by using the formula (1) and the formula (2).

One example of experimental results obtained by using the humidity sensor 7 will be explained below. Experiments were carried out under a condition where the humidity sensor 7 was installed in a test tank having a constant temperature and humidity and being about one-tenth the size of the room 200 shown in FIG. 1. In the test tank, an aluminum wall was installed as the reflector 400, and a transmission/reception face of the ultrasound element 71 was arranged to face the aluminum wall. The distance D from the ultrasound element 71 to the aluminum wall was 0.525 meters. The temperature T in the test tank was kept at 40 degrees C., and the relative humidity U was changed to 30, 40, 50, 60, 70, 80, and 90% RH. While ten pulses were applied to the ultrasound element 71, and change in the reflected waves W2 received by the ultrasound element 71 was examined. The reception circuit 75 converts each of the reflected wave W2 into a digital signal and then analyzes the digital signal as discrete data.

Figure 3:
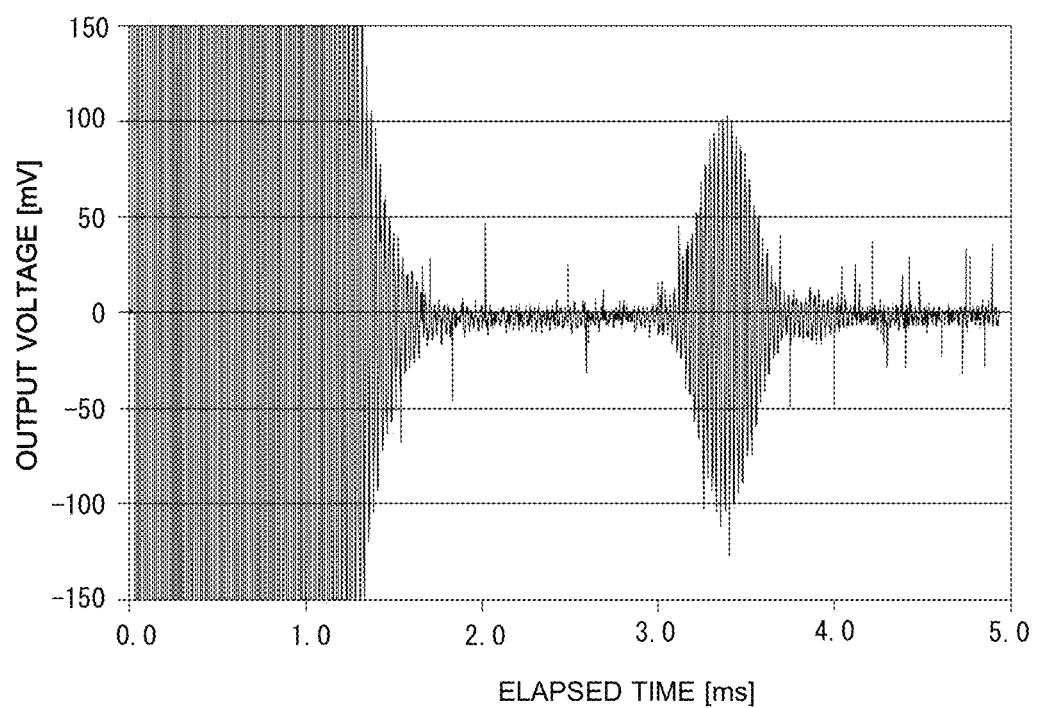
FIG. 3 is a graph showing change with time in a reflected wave received by an ultrasound element in a case where a temperature T is 40 degrees C. and a relative humidity U is 30% relative humidity (RH) in a test tank.

FIG. 3 is a graph showing change with time in a reflected wave received by the ultrasound element 71 in a case where the temperature T is 40 degrees C. and the relative humidity U is 30% RH in the test tank. The reflected wave is represented as an output voltage (mV) of the ultrasound element 71. An elapsed time of 0 ms indicates a time at which an ultrasound wave is transmitted from the ultrasound element 71. The reflected wave of the elapsed time from 0 to 1.5 ms results from a transmission sound of the ultrasound element 71.

The reception circuit 75 obtains the arrival time t of the reflected wave by squaring and integrating the output voltage shown in FIG. 3. In a case where the temperature T was 40 degrees C. and the relative humidity U was 30% RH, the reflected wave arrival time t was 2.956 ms. Although the reflected wave arrival time t is calculated by squaring and integrating the output voltage, the reflected wave arrival time t may be obtained based on the waveform of the reflected wave W2. In this case, the time at which the output voltage reaches a certain voltage may be used as the reflected wave arrival time t.

Figure 4:
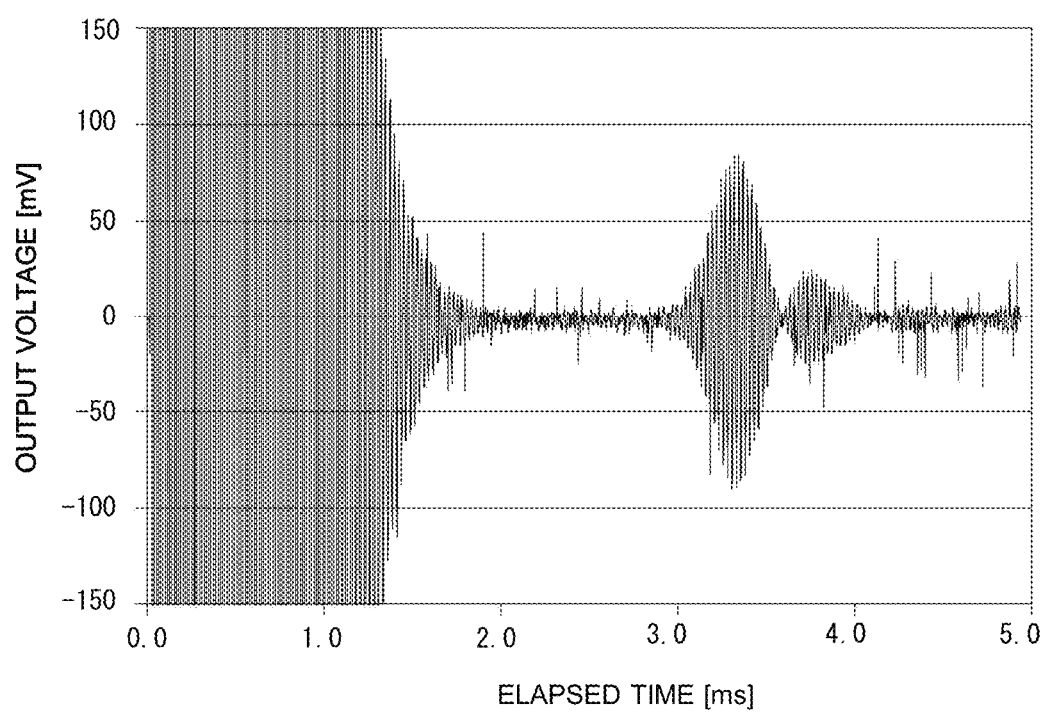
FIG. 4 is a graph showing change with time in a reflected wave received by the ultrasound element in a case where the temperature T is 40 degrees C. and the relative humidity U is 90% RH in the test tank.

FIG. 4 is a graph showing change with time in a reflected wave received by the ultrasound element 71 in a case where the temperature T is 40 degrees C. and the relative humidity U is 90% RH in the test tank. Similarly to FIG. 3, the reflected wave arrival time t is obtained by squaring and integrating the output voltage shown in FIG. 4. In this case, the reflected wave arrival time t was 2.952 ms.

Figure 5:
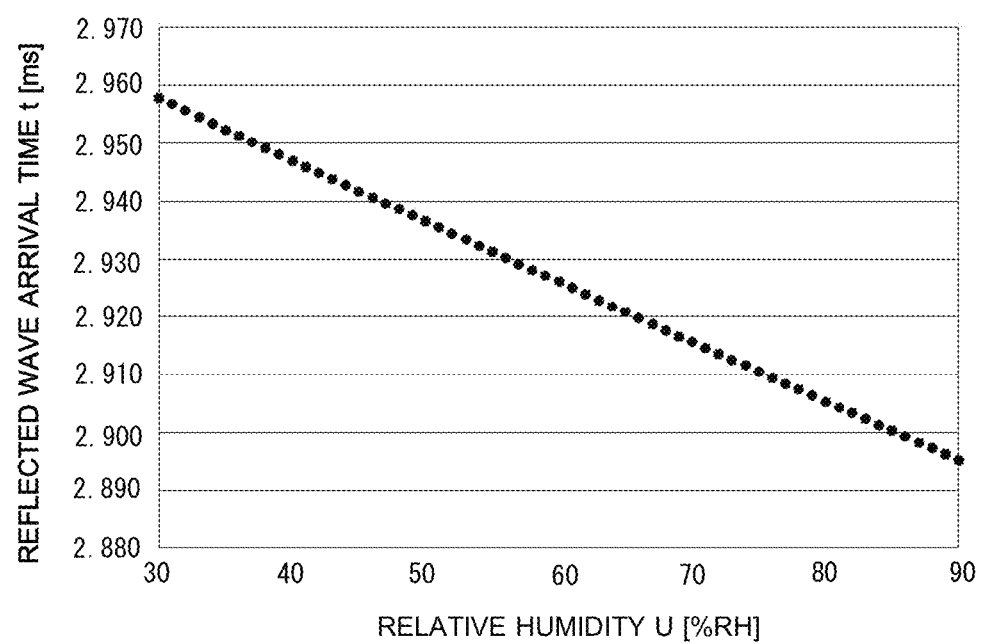
FIG. 5 is a graph showing a relation between the relative humidity U obtained by formula (1) and a reflected wave arrival time t.

FIG. 5 is a graph showing a relation between the relative humidity U obtained by the formula (1) and the reflected wave arrival time t. Note that, the relation shown in FIG. 5 was obtained by substituting the distance D=0.525 and the temperature T=40 into the formula (1).

Figure 6:
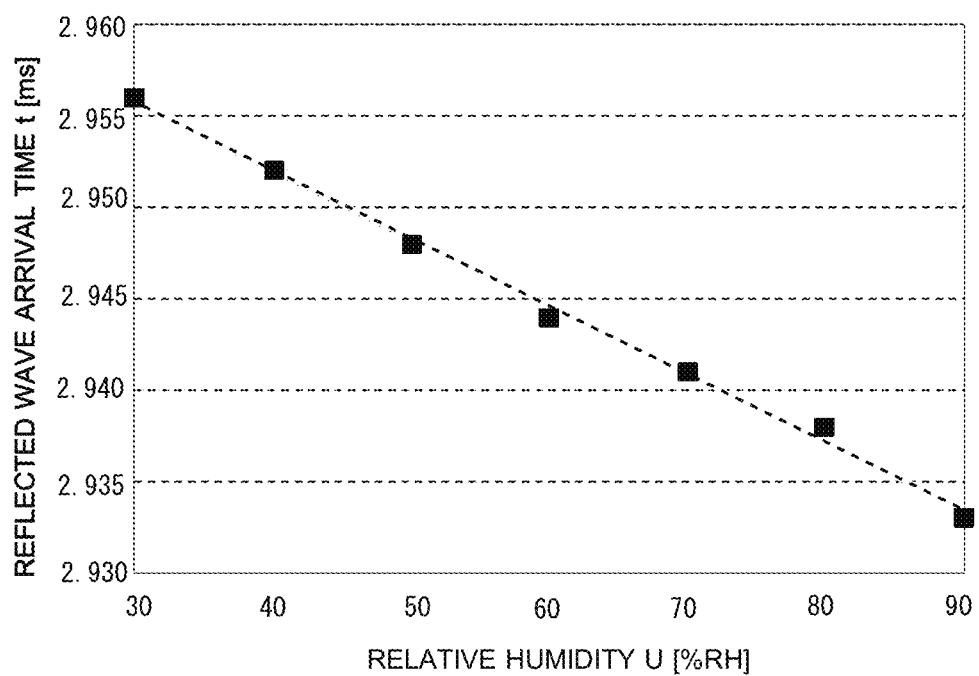
FIG. 6 is a graph on which the relative humidity values U and the reflected wave arrival times t obtained by experiments are plotted.

FIG. 6 is a graph on which relative humidity values U and reflected wave arrival times t obtained by experiments are plotted. Because data on transmission start time and arrival time of ultrasound waves is analyzed by using a method that the experimenter decides, generally there is a difference in time between the experimental values and the values obtained by calculation using the formula (1). FIG. 6 indicates that even in the experimental values, the relative humidity U and the reflected wave arrival time t are approximately proportional to each other. From this experiment result, it can be confirmed that humidity can be calculated based on the distance D, the temperature T, and the reflected wave arrival time t.

Because the output voltage of the ultrasound element 71 is a digital signal, the relative humidity U cannot be obtained by using the output voltage itself. For calculation of the relative humidity U from the reflected wave arrival time t, a relation between the reflected wave arrival time t of the ultrasound element 71 and the relative humidity U, which changes according to indoor conditions, that is the distance D and the temperature T, of the room 200 to be measured, is obtained and stored in a storage area of the humidity analysis circuit 76 in advance. Then, by performing calculation using the relation shown in FIG. 6, the relative humidity U can be obtained for an actual reflected wave arrival time t.

For example, when the temperature T is 40 degrees C., the distance D is 0.525 m, and the reflected wave arrival time t calculated by the reception circuit 75 is 2.951 ms, the relative humidity U=43% RH can be obtained for a reflected wave arrival time t of 2.951 ms from the relation shown in FIG. 6.

Figure 7:
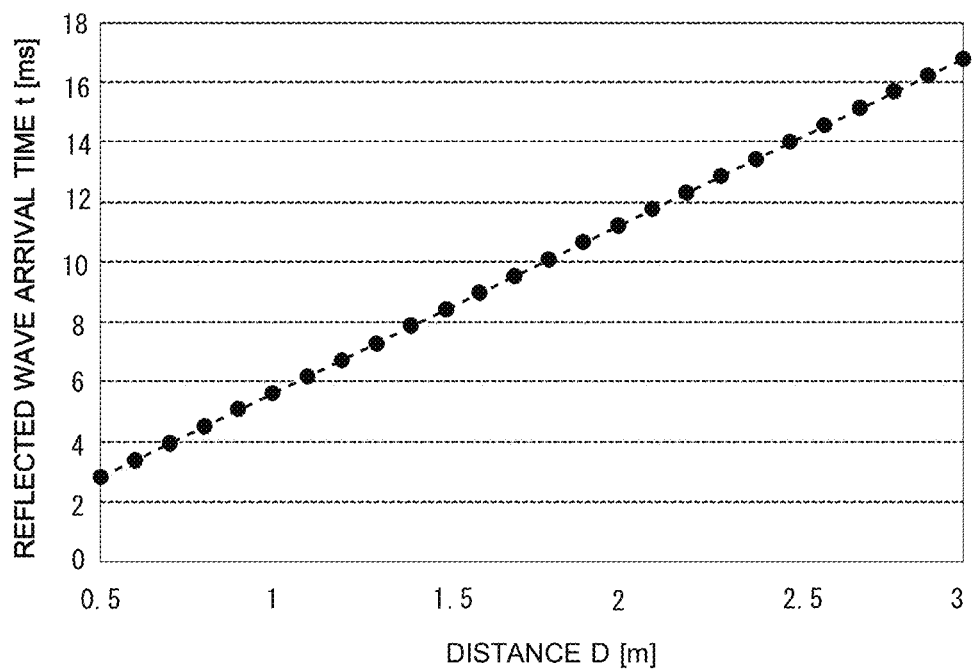
FIG. 7 is a graph showing a relation between a distance D from the ultrasound element to a reflector and the reflected wave arrival time t in a case where the temperature T is 40 degrees C. and the relative humidity U is 50% RH.

FIG. 7 is a graph showing a relation between the distance D from the ultrasound element 71 to the reflector 400 and the reflected wave arrival time t in a case where the temperature T is 40 degrees C. and the relative humidity U is 50% RH. The relation shown in FIG. 7 can be obtained by substituting the parameters into the formula (1). From FIG. 7, it can be confirmed that the distance D from the ultrasound element 71 to the reflector 400 and the reflected wave arrival time t are proportional to each other. Therefore, it is clear that, by using experimental data in which the reflected wave arrival times t are obtained by changing the temperature T, the relative humidity U, and the distance D, the relative humidity U can be calculated based on the reflected wave arrival time t.

From FIGS. 5 and 6, a similar correlation was observed for the values obtained by using the formula (1) and for the experimental values. Thus, the humidity analysis circuit 76 can obtain the relative humidity U by directly substituting the distance D, the temperature T, and the reflected wave arrival time t into the formula (1). Alternatively, the humidity analysis circuit 76 may store, in a storage area, database including a relation between the temperature T, the relative humidity U, the distance D, and the reflected wave arrival time t obtained from experiments and may obtain the relative humidity U based the database and input values of the distance D, the temperature T, and the reflected wave arrival time t.

As described above, according to the humidity sensor 7 of the present embodiment, because transmission and reception of ultrasound waves can be performed by a single ultrasound element 71, the size of the non-contact humidity sensor 7 can be reduced. In addition, the humidity sensor 7 can obtain the relative humidity U of the room 200 in a non-contact manner based on the three parameters, which are the arrival time t of a reflected wave received by the ultrasound element 71, the temperature T of the room 200, and the distance D to the reflector 400 input from the information input unit 77. Therefore, the degree of freedom in arrangement of the humidity sensor 7 is increased and thus the usability is improved.

Embodiment 2

Figure 8:
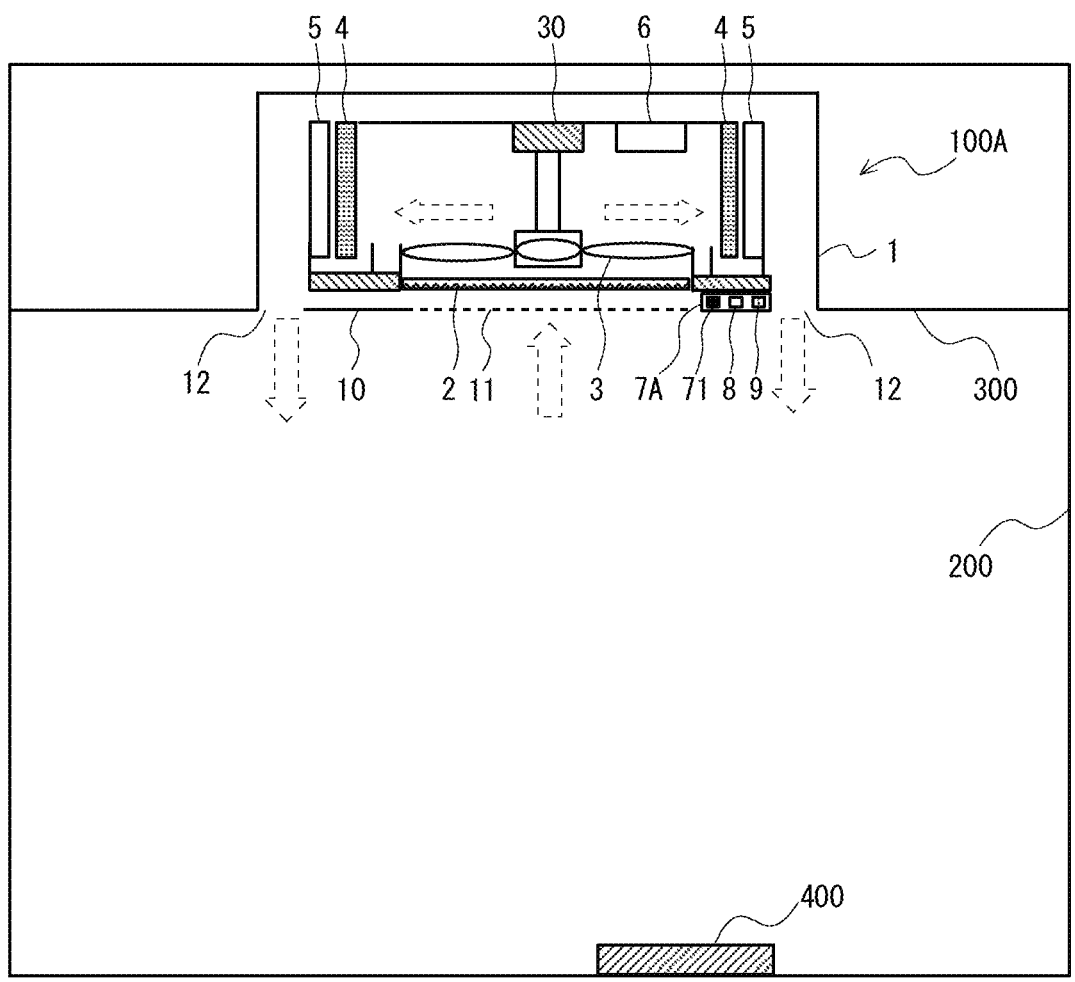
FIG. 8 is a schematic diagram of an air-conditioning apparatus equipped with a humidity sensor according to Embodiment 2.

Embodiment 2 will be described. A humidity sensor 7A of Embodiment 2 is different from the humidity sensor 7 of Embodiment 1 in that the humidity sensor 7A includes a distance sensor 8 and a temperature sensor 9, in addition to the ultrasound element 71. FIG. 8 is a schematic diagram of an air-conditioning apparatus 100A equipped with the humidity sensor 7A according to Embodiment 2. The features other than the humidity sensor 7A of the air-conditioning apparatus 100A are the same as those of Embodiment 1.

As shown in FIG. 8, the humidity sensor 7A includes the distance sensor 8 measuring the distance to the reflector 400 and the temperature sensor 9 measuring the temperature in the room 200, in addition to the ultrasound element 71. The ultrasound element 71, the distance sensor 8, and the temperature sensor 9 are integrally embedded in the humidity sensor 7A. The distance sensor 8 and the temperature sensor 9 are arranged on the bottom 10 of the casing 1 at a position between the air inlet 11 and the air outlet 12. In the present embodiment, the distance sensor 8 and the temperature sensor 9 are arranged alongside the ultrasound element 71 on the left side or right side of the air inlet 11 in such a manner as to face the reflector 400.

Figure 9:
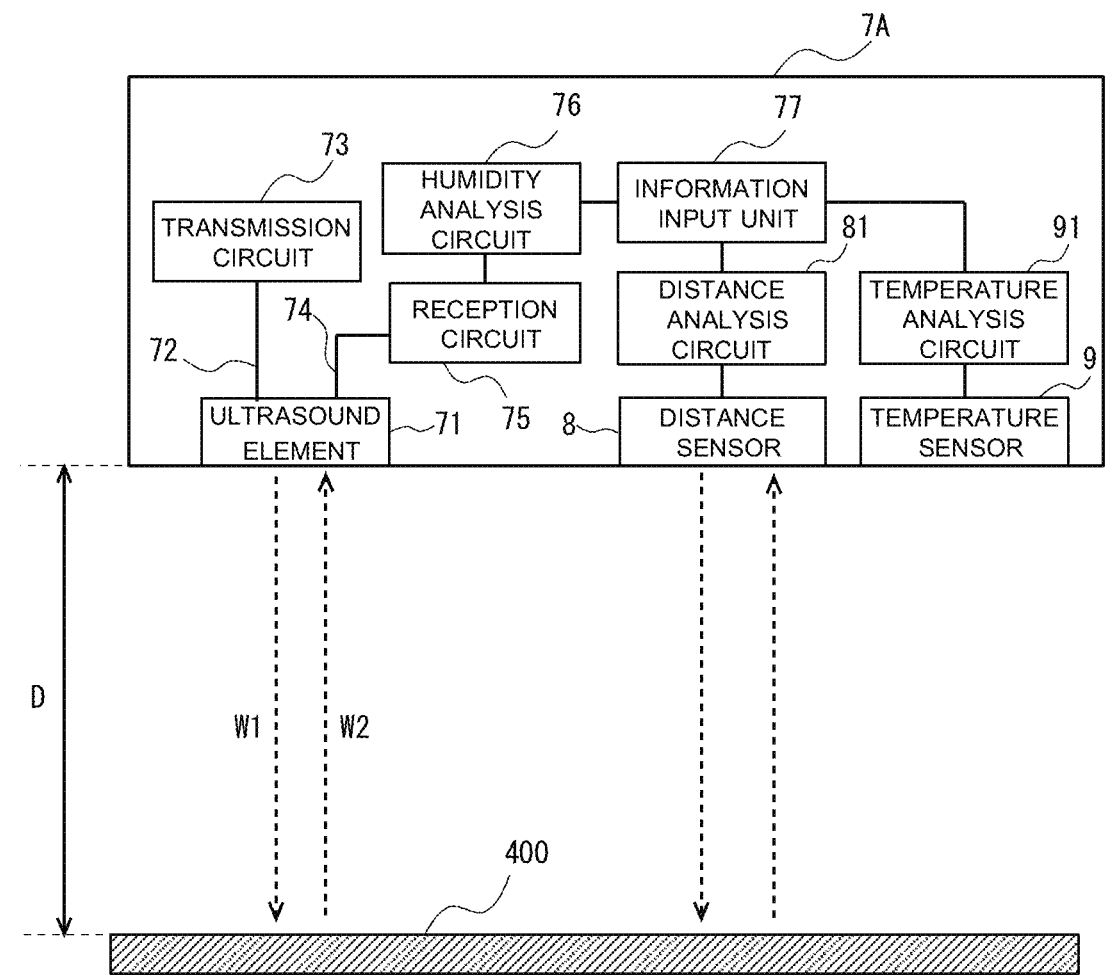
FIG. 9 is a diagram illustrating the configuration of the humidity sensor according to Embodiment 2.

FIG. 9 is a diagram illustrating the configuration of the humidity sensor 7A according to Embodiment 2. As shown in FIG. 9, the humidity sensor 7A includes the ultrasound element 71, the transmission circuit 73, the reception circuit 75, the humidity analysis circuit 76, the information input unit 77, the distance sensor 8, a distance analysis circuit 81, the temperature sensor 9, and a temperature analysis circuit 91.

The distance sensor 8 is an optical sensor or a camera. When the distance sensor 8 is an optical sensor, light irradiated from a light source in the distance sensor 8 is reflected by the reflector 400 and is received by a light receiving element of the distance sensor 8. Then, the reflected light is evaluated or calculated by the distance analysis circuit 81 and converted into distance. The distance analysis circuit 81 is configured to measure a time period from irradiation of light to reception of the light, and obtain the distance by converting the time difference into distance. When the distance sensor 8 is a camera, the distance analysis circuit 81 is configured to obtain the distance by using a triangulation distance measuring method in which an image formation position of a light receiving element, which varies depending on the distance, is converted into distance. The distance sensor 8 is arranged on the same plane as the ultrasound element 71. The distance from the distance sensor 8 to the reflector 400 is the same as the distance D from the ultrasound element 71 to the reflector 400. The distance analysis circuit 81 is connected to the information input unit 77. The distance calculated by the distance analysis circuit 81 is output to the information input unit 77 in real time.

The temperature sensor 9 is a contact type sensor, such as a thermocouple or a thermistor, or a non-contact type sensor, such as an infrared sensor. When the temperature sensor 9 is an infrared sensor, the temperature sensor 9 detects infrared radiation energy radiated from the room 200, and the temperature analysis circuit 91 calculates the temperature in a space of the room 200 based on the amount of the detected infrared energy. The temperature analysis circuit 91 is connected to the information input unit 77. The temperature calculated by the temperature analysis circuit 91 is output to the information input unit 77 in real time.

(Operation of Humidity Sensor)

Operation for measuring the relative humidity U by the humidity sensor 7A according to the present embodiment will be described. The process from the transmission and reception of an ultrasound wave by the ultrasound element 71 to the analysis of the reflected wave arrival time t by the reception circuit 75 is the same as that of Embodiment 1. After this process, the distance D from the ultrasound element 71 to the reflector 400 and the temperature T of the room 200 are measured by the distance sensor 8 and the temperature sensor 9, respectively, and are then input to the humidity analysis circuit 76 from the information input unit 77. Then, the humidity analysis circuit 76 obtains the relative humidity U of the room 200 in the same manner as Embodiment 1 by using the reflected wave arrival time t, the temperature T of the room 200, and the distance D from the ultrasound element 71 to the reflector 400 input from the information input unit 77.

As described above, according to Embodiment 2, the distance D from the ultrasound element 71 to the reflector 400 and the temperature T of the room 200, which are required values for obtaining the relative humidity U of the room 200, can be measured by the distance sensor 8 and the temperature sensor 9, and can be input to the humidity analysis circuit 76. Therefore, the calculation of the relative humidity U by the humidity sensor 7A is automated. As a result, there is no need for a user to input the distance D and the temperature T in advance, and thus the usability is further improved. Furthermore, because the actual distance D and the actual temperature T of the room 200 are measured, the accuracy of measurement for the relative humidity U is improved.

Note that, in Embodiment 2 described above, both of the distance sensor 8 and the temperature sensor 9 are installed; however, only either one of them may be installed. Alternatively, the distance sensor 8 and the temperature sensor 9 may be installed in an external device other than the humidity sensor 7A. For example, the temperature sensor 9 may be an indoor temperature sensor provided in the air-conditioning apparatus 100A. In this case, the information input unit 77 has a wireless communication function to communicate with the external device. The information input unit 77 receives the temperature T and the distance D from the external device and inputs the temperature T and the distance D to the humidity analysis circuit 76.

Embodiment 3

Figure 10:
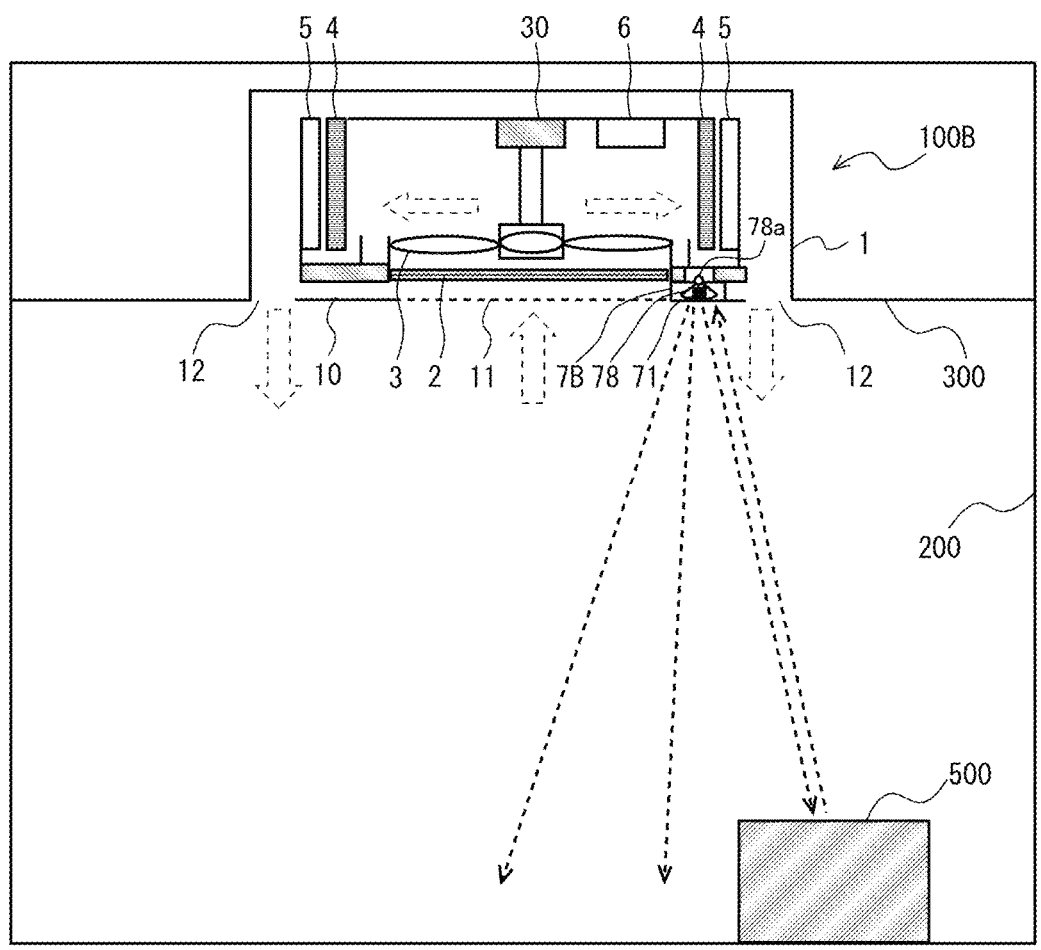
FIG. 10 is a schematic diagram of an air-conditioning apparatus equipped with a humidity sensor according to Embodiment 3.

Embodiment 3 will be described. A humidity sensor 7B of Embodiment 3 is different from the humidity sensor 7 of Embodiment 1 in that the humidity sensor 7B includes a movable mechanism 78 configured to move the ultrasound element 71. FIG. 10 is a schematic diagram of an air-conditioning apparatus 100B equipped with the humidity sensor 7B according to Embodiment 3. The features of the humidity sensor 7B other than the movable mechanism 78 are the same as those of the humidity sensor 7 of Embodiment 1, and the features other than the humidity sensor 7B of the air-conditioning apparatus 100B are the same as those of Embodiment 1.

As shown in FIG. 10, the ultrasound element 71 of the humidity sensor 7B of the present embodiment is held by the movable mechanism 78. The movable mechanism 78 includes a motor 78a, a controller configured to control the motor 78a, and a shaft extending parallel to the floor surface of the room 200, which are not shown. The ultrasound element 71 is held by the movable mechanism 78, and is moved to scan the floor surface of the room 200.

In the present embodiment, when the ultrasound element 71 transmits an ultrasound wave but does not receive a reflected wave, the ultrasound element 71 keeps moving while transmitting ultrasound waves. Then, a reflected wave is received from any reflector 500, the controller stops the movement of the ultrasound element 71, and the reception circuit 75 performs analysis of the reflected wave arrival time t based on the received reflected wave. Then, the humidity analysis circuit 76 obtains the relative humidity U based on the reflected wave arrival time t, the distance D from the ultrasound element 71 to the reflector 500, and the temperature T of the room 200. The distance D in this case is obtained from the reflected wave arrival time analyzed by the reception circuit 75 and a relation between distance and reflected wave arrival time stored in advance as a reference. Alternatively, the humidity sensor 7B may include the distance sensor 8 of Embodiment 2 to measure the distance to the reflector 500.

According to the present embodiment, the humidity of the room 200 can be obtained without installing the reflector 400 at a specific position. Therefore, the humidity can be measured in a wide range of the room 200, and thus the usability is further improved.

Although the above is the description of the embodiments, the above embodiments can be modified or combined in various ways. For example, in the above embodiments, the humidity sensor 7 includes the ultrasound element 71 configured to transmit and receive ultrasound waves but the configuration is not limited thereto. The humidity sensor 7 may include a sound wave element configured to transmit and receive sound waves. For example, the humidity sensor 7 may include a sound wave element that emits an audible sound having a frequency of 20 kHz or below. Even in this case, because the ultrasound wave and the sound wave are different only in the frequency and the wavelength, the sound wave transmitted from the sound wave element is reflected by the reflector 400 and returned to the sound wave element. Therefore, as with the abovementioned embodiments, the humidity of the room 200 can be obtained based on the arrival time of the reflected wave.

Furthermore, although the abovementioned embodiments indicate that the reception circuit 75 and the humidity analysis circuit 76 are provided separately, the function of the reception circuit 75 and the function of the humidity analysis circuit 76 may be incorporated into a single circuit, or may be executed by a microcomputer. In addition, the function of the distance analysis circuit 81 and the function of the temperature analysis circuit 91 may be incorporated into the same single circuit as the reception circuit 75 and the humidity analysis circuit 76, or may be executed by a microcomputer. The transmission circuit 73 and the reception circuit 75 may be integrated into a pulser-receiver.

REFERENCE SIGNS LIST

1: casing, 2: filter, 3: fan, 4: heat exchanger, 5: humidification element, 6: controller, 7, 7A, 7B: humidity sensor, 8: distance sensor, 9: temperature sensor, 10: bottom, 11: air inlet, 12: air outlet, 30: motor, 71: ultrasound element, 72: electric wire, 73: transmission circuit, 74: electric wire, 75: reception circuit, 76: humidity analysis circuit, 77: information input unit, 78: movable mechanism, 81: distance analysis circuit, 91: temperature analysis circuit, 100, 100A, 100B: air-conditioning apparatus, 200: room, 300: ceiling, 400, 500: reflector

The invention claimed is:

1. A humidity sensor comprising:
a sound wave element including a piezoelectric ceramic and electrodes connected to the piezoelectric ceramic, the sound wave element being configured to transmit a sound wave and receive the sound wave reflected by a reflector;
a motor configured to move the sound wave element;
a reception circuit configured to obtain an arrival time of the reflected sound wave received by the sound wave element;
a humidity analysis circuit configured to calculate relative humidity from the arrival time, a distance from the sound wave element to the reflector, and a temperature of a space from the sound wave element to the reflector; and
information input circuitry configured to receive input of the distance and the temperature.

2. The humidity sensor of claim 1, wherein the sound wave element is arranged to face the reflector.

3. The humidity sensor of claim 1, further comprising a distance sensor configured to measure the distance.

4. The humidity sensor of claim 3, further comprising a distance analysis circuit configured to calculate the distance based on information from the distance sensor.

5. The humidity sensor of claim 4, wherein the distance sensor is an optical distance sensor configured to transmit light to the reflector and to receive the light reflected by the reflector, and
the distance analysis circuit is configured to calculate the distance based on a time period between transmission of the light by the distance sensor and reception of the light reflected by the reflector by the distance sensor.

6. The humidity sensor of claim 4, wherein the distance sensor is a camera configured to capture an image of a light receiver, and
the distance analysis circuit is configured to calculate the distance based on triangulation from the image of the light receiver.

7. The humidity sensor of claim 3, wherein the distance sensor is disposed so that a distance from the distance sensor to the reflector is the same as a distance from the sound wave element to the reflector.

8. The humidity sensor of claim 1, further comprising a temperature sensor configured to measure the temperature.

9. The humidity sensor of claim 8, wherein the temperature sensor includes one of a thermistor, a thermocouple, or an infrared temperature sensor.

10. The humidity sensor of claim 1, further comprising:
a controller configured to control the motor.

11. The humidity sensor of claim 10, wherein the controller is configured to cause the motor to:
move the sound wave element while the sound wave element transmits the sound wave, and
stop moving the sound wave element when the sound wave element receives the sound wave reflected by the reflector.

12. An air-conditioning apparatus comprising:
the humidity sensor of claim 1;
a heat exchanger; and
a fan.

13. The air-conditioning apparatus of claim 12, wherein the information input circuitry includes a remote control of the air-conditioning apparatus.

14. The air-conditioning apparatus of claim 12, further comprising a controller configured to control the heat exchanger and the fan based on the relative humidity calculated by the humidity analysis circuit of the humidity sensor.

15. The air-conditioning apparatus of claim 12, wherein the air-conditioning apparatus is disposed in a ceiling of a room and the reflector is disposed on a floor of the room, the reflector facing the sound wave element.

16. The humidity sensor of claim 1, further comprising a transmission circuit configured to apply an electric signal to the sound wave element to cause the sound wave element to transmit the sound wave.

17. The humidity sensor of claim 16, wherein the electric signal is one of a pulse wave signal or a continuous sinewave signal.

18. The humidity sensor of claim 1, wherein the distance and temperature are stored in the humidity sensor prior to the sound wave element transmitting the sound wave.

19. The humidity sensor of claim 1, wherein the humidity analysis circuit is configured to calculate the relative humidity based, at least in part, on experimental data of relative humidity values determined from known conditions, the experimental data being pre-stored in the humidity sensor.

20. A method for a humidity sensor, comprising:
causing a sound wave element to transmit a sound wave and to receive the sound wave reflected by a reflector, the sound wave element including a piezoelectric ceramic connected to electrodes;
moving, using a motor, the sound wave element;
determining an arrival time of the sound wave reflected by the reflector and received by the sound wave element;
receiving input of a distance from the sound wave element to the reflector and a temperature of a space from the sound wave to the reflector; and
calculate a relative humidity from the arrival time, the distance, and the temperature.

* * * * *